March 10, 1936.                    N. B. CUFF                    2,033,817

TEST CARD SCORING APPARATUS FOR STUDENTS' USE

Filed July 24, 1934

Noel B. Cuff, INVENTOR

BY Victor J. Evans & Co.

ATTORNEY

Patented Mar. 10, 1936

2,033,817

UNITED STATES PATENT OFFICE 2,033,817

TEST-CARD SCORING APPARATUS FOR STUDENTS' USE

Noel B. Cuff, Richmond, Ky.

Application July 24, 1934, Serial No. 736,739

1 Claim. (Cl. 35—48)

The invention relates to a test card scoring apparatus and more especially to an apparatus for determining by weight the correctness of scores as made by students on a test examination.

The primary object of the invention is the provision of an apparatus of this character wherein through the use of weighing scales, correct test scorings as executed by a student in answering questions through the use of a perforated answer card can be had with dispatch and by weight, the apparatus being novel in construction and eliminating the drudgery and errors of counting answers as is now done in educational institutions.

Another object of the invention is the provision of an apparatus of this character wherein great saving both in time and labor is assured for determining accuracy of scorings made by students under an objective test, as the ordinary marking and counting of test responses is entirely eliminated, thereby enabling a teacher to report scores to students when they are most likely to have favorable effects.

A further object of the invention is the provision of an apparatus of this character which is extremely simple in its construction, thoroughly reliable and efficient in its purpose and operation, strong, durable, enabling correct scores to be visible at a glance, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the appended claim.

In the accompanying drawing.

Similar reference characters indicate corresponding parts throughout the several views in the drawing.

Figure 1:
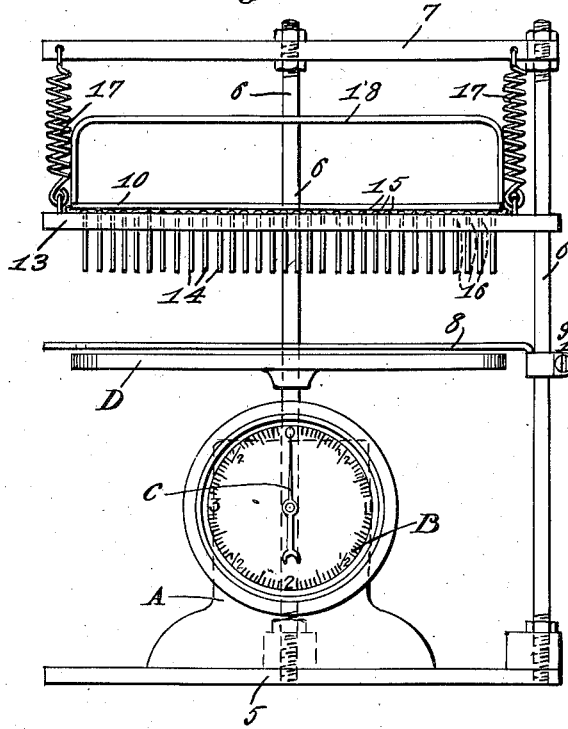
Figure 1 is a front elevation of an apparatus constructed in accordance with the invention.

Referring to the drawing in detail, A designates generally a weighing scale of any approved kind having the graduated weight indicating dial B and pointer or indicator C, this being operated from a weighing platform D and cooperating with the scale dial B for ascertaining determined weights. The scale body A is superimposed upon a platform or base 5 from which rise spaced vertical uprights 6, these supporting at their upper ends horizontal hangers 7 which are fixed in any suitable manner to the said uprights and likewise the said uprights are fixed to the base 5 in any suitable manner.

Adjustably carried by the uprights is a test score card holder 8, it providing an open frame 9 for removably supporting a perforated answer card which consists of two duplicate cardboards 9' and 10, respectively, with holes 11, preferably five hundred in number, and an interposed thin sheet 12, the cardboard 9' being approximately one-half inch shorter at its bottom than the cardboard 10, so that the student can write his name, class or the like on the inserted sheet of paper 12. The answers to a test examination, that is, questions making upon the same, will be had by punching with a pencil point through the right hole indicative of the correct answer as present in the sheet 12 in register with said puncture.

Slidably fitted with an upright 6 is a weight elevator 13 in which are arranged pin-like weights 14, these being loosely supported in vertical holes therefor in the elevator 13 and having upper heads 15 of greater size than the holes 16 receiving said pin-like weights 14, so that the said weights 14 cannot drop through the holes 16 and fall from the elevator 13, as the heads 15 of the weights 14 normally rest upon the elevator 13 when the latter is in a raised or elevated position. The weights 14 are of a number corresponding to the number of holes in the perforated answer card hereinbefore mentioned.

The elevator 13 is suspended by coiled expansion springs 17 connected with the hangers 7 and these springs normally hold the elevator 13 raised. The elevator 13 carries a handle 18, so that the same can be lowered by pressure from the hand of an operator against the resistance of the springs 17. On the lowering of the elevator 13, those weights 14 registering with the punches in the perforated answer card will drop onto the weighing platform D of the scale and thus the scale A, through the pointer or hand C cooperating with the weight indicating dial B, will enable the determining by weight of the score had by a student through the instrumentality of the perforated answer card. Those weights 14 not registering with the punches scored by the student in the said answer card will become raised and out of contact with the weighing platform D of the scale A and by placing a board 19 upon these raised weights 14 the same can be manually forced or by its own weight caused to puncture the answer card to punch the same at other places than that of the punches as made by the student and thus afford correction to the examinee's mistakes for a permanent record thereof.

In setting up the apparatus for weighing a particular test, the operator thereof inserts in each hole in the elevator 13 which corresponds with the hole in the answer card which should be punched by the student the weight 14 of pin-like form. This weight projects perpendicularly to the elevator and is acted upon by vertical force and all weights being light enough that if the paper has not been punched through a given answer hole the paper 12 will suffice to hold up that weight. In scoring a given answer card the operator first simply places it on the frame 9 and then lowers the elevator 13. At every place where a correct hole has been punched, a weight 14 falls to the weighing platform D of the scale A, which is slightly below the holder 8, and in all other cases the weights 14 are held up off of the weighing platform D of the scale A. Thus those weights 14 imposed upon the platform D will operate the scale A, so that a count may be had by weight of the correctness of the score as made by a student in the punching of the answer card, the punches being indicative of the answers to questions under a test examination.

Figure 2:
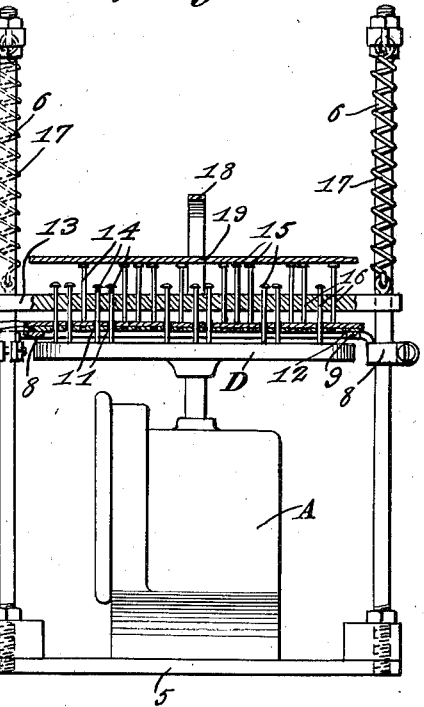
Figure 2 is a side elevation partly in section.
Figure 3:
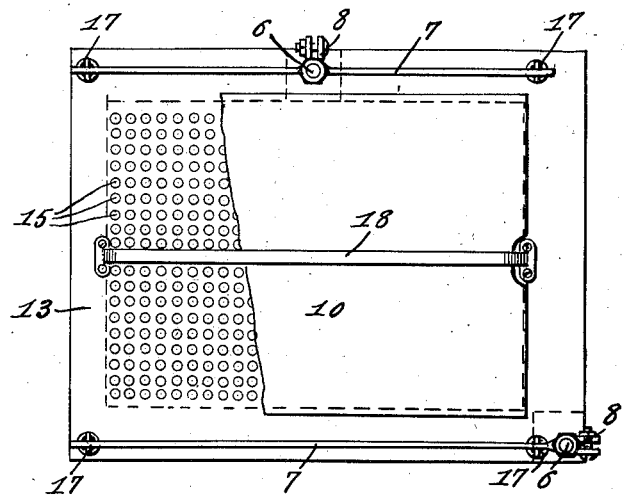
Figure 3 is a top plan view partly broken away.

When hand pressure is relieved from the handle 18 of the elevator 13 the latter, under the action of the spring 17, returns to normal position or is elevated and all pins 14 carried thereby will come to rest by the contact of the heads 15 with the elevator 13 as shown in Figure 1 of the drawing. The separated pins or those dropped as liberated by the punches in the score card and indicative of the answers to a test examination are shown in Figure 2 of the drawing, and the scale indicating by weight the correctness of the score.

What is claimed is:

The herein described construction of test card scoring apparatus for students' use comprising a flat base having a platform scale thereon and having uprights arising therefrom, horizontal hangers fixed on the uprights, a perforated plate comprising a weight elevator guided on the uprights, suspending springs carried by the hangers yieldably supporting the elevator, headed weight pins, all of an equal length and weight in the perforations of the elevator, a horizontally disposed frame above the scale platform adjustably supported on the uprights, said frame removably supporting therein a test card having a series of perforations designed to receive therethrough the pin weights in registering alignment with the perforations to cause the latter to rest on the platform of the scale to indicate on such scale the correct answer to an objective test, and said test card affording a rest for an answer card which has been perforated by a student and arranged to have its perforations register with those of the test card, for the purpose set forth.

NOEL B. CUFF.